United States Patent
Lytkin (10) Patent No.: US 11,568,309 B1
(45) Date of Patent: Jan. 31, 2023

(54) SYSTEMS AND METHODS FOR RESOURCE-EFFICIENT DATA COLLECTION FOR MULTI-STAGE RANKING SYSTEMS

(71) Applicant: Meta Platforms, Inc., Menlo Park, CA (US)

(72) Inventor: Nikita Igorevych Lytkin, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 841 days.

(21) Appl. No.: 16/460,185

(22) Filed: Jul. 2, 2019

(51) Int. Cl.
*G06F 16/00* (2019.01)
*G06N 20/00* (2019.01)
*G06F 17/18* (2006.01)
*G06K 9/62* (2022.01)

(52) U.S. Cl.
CPC .............. *G06N 20/00* (2019.01); *G06F 17/18* (2013.01); *G06K 9/623* (2013.01); *G06K 9/6259* (2013.01)

(58) Field of Classification Search
CPC ........ G06N 20/00; G06F 17/18; G06K 9/623; G06K 9/6259
See application file for complete search history.

(56) References Cited

U.S. PATENT DOCUMENTS

| | | | |
|---|---|---|---|
| 8,150,723 B2 * | 4/2012 | Chen | G06Q 10/0639 705/7.29 |
| 10,726,313 B2 * | 7/2020 | Lee | G06V 30/194 |
| 11,003,720 B1 * | 5/2021 | Xia | G06N 20/00 |
| 11,120,364 B1 * | 9/2021 | Gokalp | G06N 20/00 |
| 11,270,159 B1 * | 3/2022 | Gao | H04N 21/4826 |
| 11,325,607 B1 * | 5/2022 | Sanchez | G07C 5/085 |
| 2015/0248715 A1 * | 9/2015 | Johnson | G06Q 30/0609 705/26.35 |
| 2016/0078364 A1 * | 3/2016 | Chiu | G06F 16/3338 706/11 |
| 2019/0114556 A1 * | 4/2019 | Ye | G06V 40/10 |
| 2020/0034749 A1 * | 1/2020 | Kumar | G06N 3/006 |
| 2020/0410289 A1 * | 12/2020 | Arunmozhi | G06N 5/003 |
| 2022/0138004 A1 * | 5/2022 | Nandakumar | G06F 8/34 718/102 |

* cited by examiner

*Primary Examiner* — Noosha Arjomandi
(74) *Attorney, Agent, or Firm* — Sheppard Mullin Richter & Hampton LLP (57) ABSTRACT

Systems, methods, and non-transitory computer-readable media can receive a set of candidate training items for training an early stage model in a multi-stage recall optimization model, wherein the multi-stage recall optimization model comprises the early stage model and a target model. A random subset of the candidate training items is selected from the set of candidate training items. For each training item in the subset of candidate training items, a score is determined based on the target model. Each training item in the subset of candidate training items is labeled with a label based on a probability of the training item being a top-K of the set of candidate training items had the set of candidate training items been scored based on the target model.

20 Claims, 7 Drawing Sheets

```
┌─────────────────────────────────────────────────────────────────────────┐
│ Receive a set of candidate training items for training an early stage   │
│ model in a multi-stage recall optimization model, wherein the           │
│ multi-stage recall optimization model comprises the early stage model   │
│ and a target model                                                       │
│                                   502                                    │
└─────────────────────────────────────────────────────────────────────────┘
                                      │
                                      ▼
┌─────────────────────────────────────────────────────────────────────────┐
│ Select a random subset of candidate training items from the set of      │
│ candidate training items                                                 │
│                                   504                                    │
└─────────────────────────────────────────────────────────────────────────┘
                                      │
                                      ▼
┌─────────────────────────────────────────────────────────────────────────┐
│ Determine, for each training item in the subset of candidate training   │
│ items, a score based on the target model                                 │
│                                   506                                    │
└─────────────────────────────────────────────────────────────────────────┘
                                      │
                                      ▼
┌─────────────────────────────────────────────────────────────────────────┐
│ Label each training item in the subset of candidate training items      │
│ with a label based on a probability of the training item being in a     │
│ top-K of the set of candidate training items had the set of candidate   │
│ training items been scored based on the target model                    │
│                                   508                                    │
└─────────────────────────────────────────────────────────────────────────┘
```

SYSTEMS AND METHODS FOR RESOURCE-EFFICIENT DATA COLLECTION FOR MULTI-STAGE RANKING SYSTEMS

FIELD OF THE INVENTION

The present technology relates to the fields of data collection and machine learning models. More particularly, the present technology relates to techniques for resource-efficient data collection for training one or more machine learning models.

BACKGROUND

Today, people often utilize computing devices (or systems) for a wide variety of purposes. Users can use their computing devices to, for example, interact with one another, access content, share content, and create content. Content may include media content items, such as images, video, or audio content. In some cases, content may be provided to users based on various machine learning models. For example, content recommender systems may utilize one or more machine learning models to suggest or provide content to users.

SUMMARY

Various embodiments of the present technology can include systems, methods, and non-transitory computer readable media configured to receive a set of candidate training items for training an early stage model in a multi-stage recall optimization model, wherein the multi-stage recall optimization model comprises the early stage model and a target model. A random subset of the candidate training items is selected from the set of candidate training items. For each training item in the subset of candidate training items, a score is determined based on the target model. Each training item in the subset of candidate training items is labeled with a label based on a probability of the training item being a top-K of the set of candidate training items had the set of candidate training items been scored based on the target model.

In an embodiment, the label is a non-binary label.

In an embodiment, the label is a value between 0 and 1.

In an embodiment, the probability of each training item being in the top-K of the set of candidate training items is determined based on a hypergeometric distribution.

In an embodiment, the label for a training item is equal to the probability of the training item being in the top-K of the set of candidate training items had the set of candidate training items been scored based on the target model.

In an embodiment, the early stage model is trained based on the labels for the subset of candidate training items.

In an embodiment, the target model is trained based on a labeled set of training data, wherein the labeled set of training data is labeled based on user feedback information.

In an embodiment, the subset of candidate training items is ranked based on the scores.

In an embodiment, a set of candidate items are provided to the multi-stage recall optimization model. A set of the top-K items from the set of candidate items is identified based on the multi-stage recall optimization model.

In an embodiment, identifying the set of the top-K items from the set of candidate items based on the multi-stage recall optimization model comprises: identifying a first subset of the set of candidate items based on the early stage model; providing the first subset of the set of candidate items to the target model; and identifying the set of top-K items from the set of candidate items based on the target model.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Resource-Efficient Data Collection

People often utilize computing devices (or systems) for a wide variety of purposes. Users can use their computing devices to, for example, interact with one another, access content, share content, and create content. Content may include media content items, such as images, video, or audio content. In some cases, content may be provided to users based on various machine learning models. For example, content recommender systems may utilize one or more machine learning models to suggest or provide content to users.

Machine learning models, such as those that may be implemented in a recommender system, may be configured to select a subset of the "best" content items from a larger set of candidate items based on various features and objective functions. Systems utilizing machine learning models may also be required to make such determinations relatively quickly. For example, in the advertisement context, one or more machine learning models may be configured to receive a set of user features associated with a user, and to quickly identify one or more advertisements from a large set of candidate advertisements that are most likely to be of interest to the user (e.g., most likely to receive interaction from the user). More complex machine learning models may be more accurate than relatively simple models, but more complex machine learning models may also be very resource intensive, as they may consider a very large set of features and factors when making their determinations. The complexity of these machine learning models may strain the limits of various practical constraints, such as latency constraints, CPU constraints, memory constraints, and the like. This is particularly true in contexts where machine learning models must make millions of determinations in a short period of time. This may be the case, for example, in social networking systems with millions of users, or in advertisement systems that provide advertisements to millions of users at any given time. While it may be desirable to apply the most complex, most accurate machine learning models to every possible determination, such an approach may be impractical or infeasible in many applications. As such, machine learning models must be structured and trained in ways that make efficient use of available resources while still making the most accurate determinations possible. Conventional approaches may not be effective in addressing these and other problems arising in computer technology.

An improved approach rooted in computer technology overcomes the foregoing and other disadvantages associated with conventional approaches specifically arising in the realm of computer technology. In general, a recall optimization model may comprise multiple stages. A recall optimization model can be configured to receive a set of candidate items and select, from the set of candidate items, a subset of items (e.g., the "top-K" items, where K is some pre-determined number) that the model deems "best" according to a particular objective function. In various embodiments, a recall optimization model can comprise multiple machine learning models (also referred to herein simply as "models"). The multiple machine learning models may be arranged in a particular hierarchy or order.

As discussed above, when a set of candidate items is very large, it may be impractical for a complex machine learning model to analyze each and every candidate item to select the top-K candidate items. As such, a multi-stage recall optimization model may include multiple models of varying complexities at various stages, with the set of candidate items being narrowed at each stage. For example, a two-stage model may comprise a target model of high complexity, and an early stage model of relatively lower complexity. The early stage model can be configured to analyze a set of candidate items to select a first subset of candidate items. The first subset of candidate items can then be provided to the relatively more complex target model, and the target model can be configured to select a second, final subset of candidate items (e.g., the top-K items).

In certain embodiments, the target model may be trained based on ground truth labels from user feedback. For example, the target model may be trained based on a training set that has been labeled based on user feedback (e.g., a positive user interaction or user conversion is labeled as a positive label, and lack of user interaction or failed conversion is labeled as negative label). Conversely, rather than training the early stage model based on the ground truth labels from user feedback, the early stage model may be trained to predict which items in an input set would have been ranked amongst the top-K by a later stage (e.g., by the target model). As such, an early stage model may be trained using labels indicating whether an item in a training set would have fallen within the top-K items of the training set had the entire training set been scored using the target model.

In various embodiments, the present technology comprises various improved approaches to data collection for training an early stage model in a multi-stage recall optimization model. One way to generate a labeled training set for training an early stage model is to obtain a training set, and to apply a later stage model (e.g. the target model) to all items in the training set. This approach has the advantage of producing an exhaustive labeling of all items in the training set. However, this approach can be problematic due to its high computational requirements, as well as the potential for wasted computation. It may be the case that, while it may be feasible to score all items in the training set, it may be infeasible to actually store all of the training examples resulting from the exhaustive labeling. And even if it is possible to physically store all of the data, it may be impossible to train the early stage model on so many examples. As such, heavy downsampling of the labeled training set may be required. However, such downsampling inherently means wasted computation.

In an improved approach, the present technology provides for an approach in which a training set can be acquired and then randomly sampled. The sampled training set can then be scored based on a later stage model (e.g., a target model). The sampled training set can then be labeled according to the scores. In an exhaustive labeling approach, each item in a training set could be given a binary label as to whether or not the item was in the top-K of the entire training set. This is possible because scores were calculated for each item in the training set using the target model. However, in the sampled labeling approach described herein, such binary labeling may not be possible because only a portion of a training set is scored using the target model, and it cannot be said with absolute certainty whether a particular training item would have been in the top-K of the entire training set. As such, the disclosed technology provides for "soft labeling" of each item in the sampled training set, wherein each soft (e.g., non-binary) label is indicative of a probability or likelihood that an item would have been in the top-K of the entire training set had exhaustive labeling been performed. The early stage model can be trained based on the soft labels and the sampled training set. More details relating to the disclosed technology are provided below.

Figure 1:
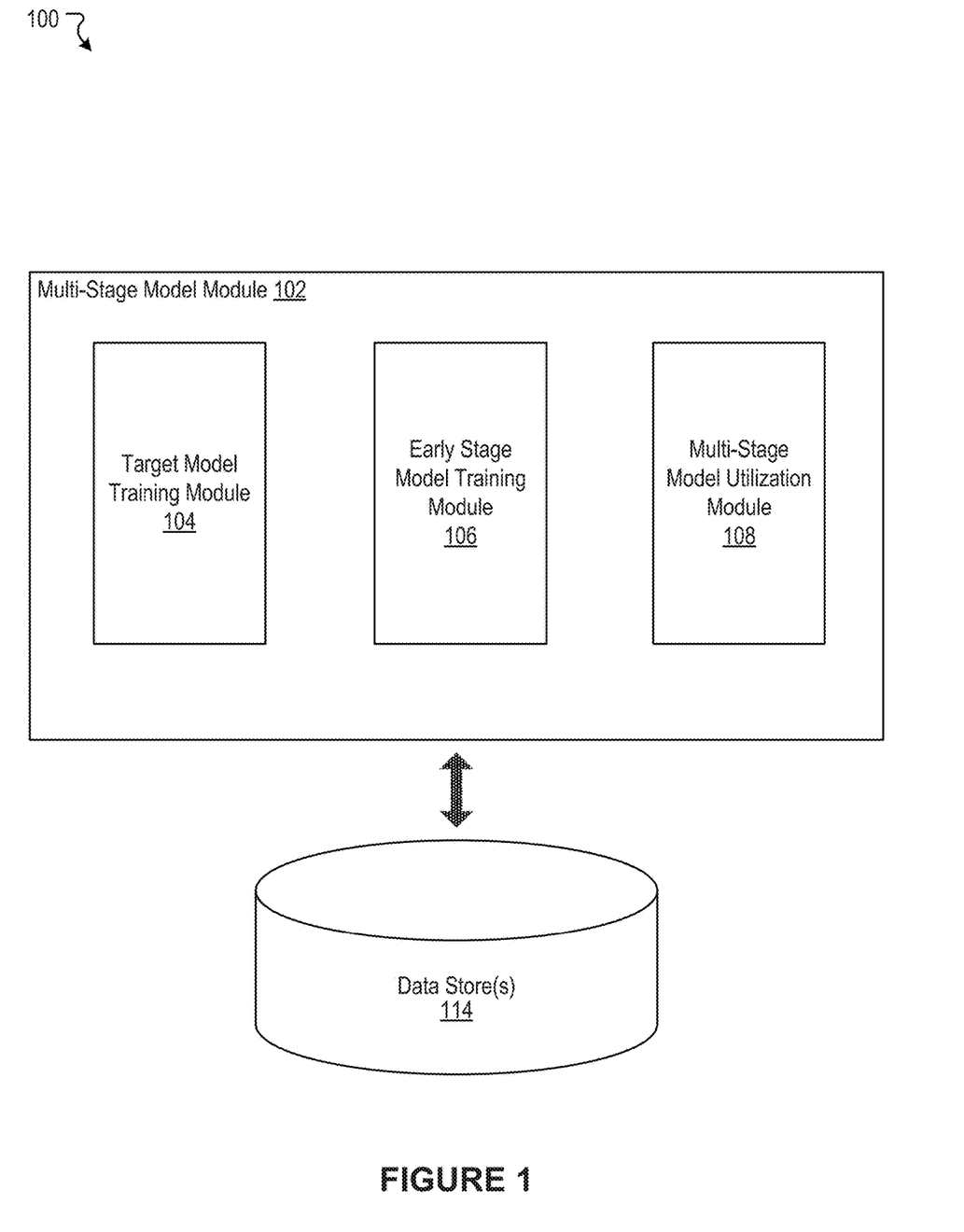
FIG. 1 illustrates an example system including a multi-stage model module, according to an embodiment of the present technology.

FIG. 1 illustrates an example system 100 including a multi-stage model module 102, according to an embodiment of the present technology. As shown in the example of FIG. 1, the multi-stage model module 102 can include a target model training module 104, an early stage model training module 106, and a multi-stage model utilization module 108. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the advertisement pipeline testing module 102 can be implemented in any suitable combinations.

In some embodiments, the multi-stage model module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the multi-stage model module 102 can be, in part or in whole, implemented as software running on one or more computing devices or systems, such as on a server system or a client computing device. In some instances, the advertisement pipeline testing module 102 can be, in part or in whole, implemented within or configured to operate in conjunction with or be integrated with a social networking system (or service), such as a social networking system 630 of FIG. 6. Likewise, in some instances, the multi-stage model module 102 can be, in part or in whole, implemented within or configured to operate in conjunction with or be integrated with a client computing device, such as the user device 610 of FIG. 6. For example, the advertisement pipeline testing module 102 can be implemented as or within a dedicated application (e.g., app), a program, or an applet running on a user computing device or client computing system. The application incorporating or implementing instructions for performing functionality of the multi-stage model module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The multi-stage model module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the multi-stage model module 102. For example, the data store 114 can store a target model, an early stage model, training data for one or more machine learning models, and the like. It is contemplated that there can be many variations or other possibilities.

The target model training module 104 can be configured to train a target model in a multi-stage recall optimization model. As discussed above, a multi-stage recall optimization model can have multiple models (including a target model and an early stage model) that are jointly configured to receive a set of candidate items, score the set of candidate items, and identify a subset of the top-K items based on the scores. In this way, the recall optimization model may be configured to select the top-K items in a set of candidate items for a particular objective. For example, in the context of advertisements, the recall optimization model may be trained to receive a set of user features associated with a user, as well as a set of candidate advertisements. The recall optimization model can be trained to determine, based on the set of user features and advertisement features for each advertisement in the set of candidate advertisements, a score for each advertisement indicative of the likelihood that the user will interact positively with the advertisement (e.g., click-through on the advertisement). A subset of the set of candidate items can be selected based on the scores (e.g., the top 10 advertisements out of a set of 1000 advertisements, or the top 1 advertisement).

A multi-stage recall optimization model can have multiple models. The multiple models can include a target model that is configured to output a final set of items (i.e., the top-K items), and an early stage model that is configured to narrow the set of candidate items to a smaller subset of items. The smaller subset of items can be fed to the target model, and the target model can select the top-K items from the subset of items. As discussed above, the target model may be a more complex model than the early stage model, such that use of the early stage model to narrow the set of candidate models represents a more efficient use of computing resources.

Figure 2:
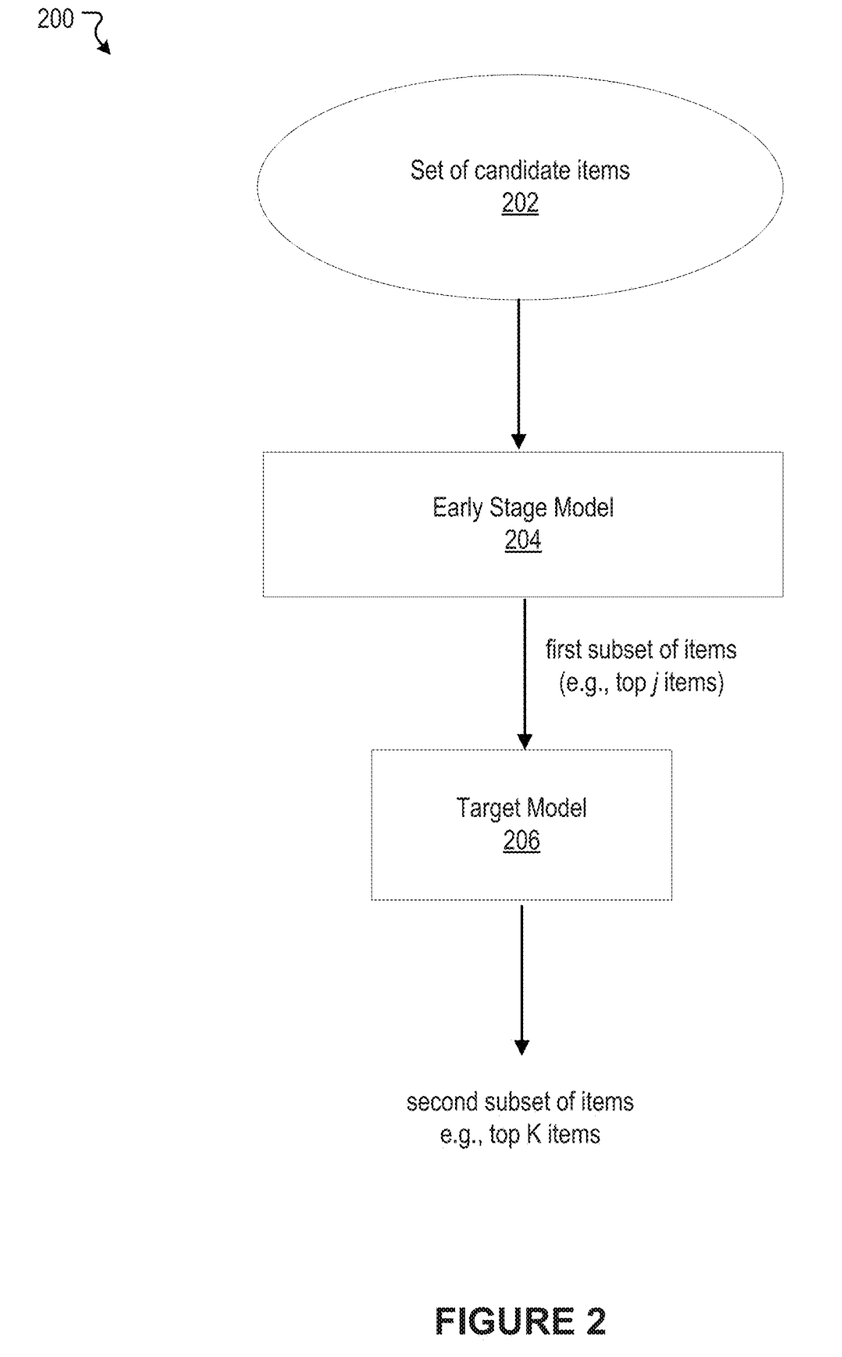
FIG. 2 illustrates an example multi-stage model, according to an embodiment of the present technology.

FIG. 2 illustrates an example multi-stage recall optimization model 200. The multi-stage recall optimization model 200 includes an early stage model 204 and a target model 206. The early stage model 204 receives a set of candidate items 202 and narrows them down into a first subset of items (e.g., the top j items from the set of candidate items). The first subset of items can then be provided to the target model 206. The target model 206 can further narrow the subset of items into a second, final subset of items (i.e., the top-K items in the set of candidate items, where K<j).

In certain embodiments, the early stage model 204 may be configured to score each item in the set of candidate items with an initial score. The initial score for a candidate item may be indicative of a likelihood that the item would be in the top-K of the set of candidate items 202 if the target model 206 analyzed and scored the entire set of candidate items 202. The early stage model 204 can rank the set of candidate models based on the initial scores, and select the top items based on the initial scores (e.g., the top j items). These concepts will be described in greater detail herein.

Returning to FIG. 1, the target model training module 104 can be configured to train a target model in a multi-stage recall optimization model. The target model training module 104 can be configured to obtain a set of training data, apply labels to each item in the set of training data, and train a target model based on the labeled set of training data. The target model may be trained based on a set of training data that has been labeled using "ground truth" labels associated with an objective function of the multi-stage recall optimization model (e.g., a user feedback objective). For example, if the objective of the multi-stage recall optimization model is to identify advertisements or content that is most likely to result in user interaction, the labels used to train the target model may be indicative of whether or not certain advertisements or content in the set of training data received the desired user interaction (e.g., a positive label if user interaction occurred, a negative label if user interaction did not occur). In an embodiment, the target model can be configured such that, if computing resources and latency were not an issue, the target model could be used on its own to carry out the objective of the recall optimization model.

The early stage model training module 106 can be configured to train an early stage model in a multi-stage recall optimization model. As discussed above, whereas a target model is trained based on ground truth labels associated with the recall optimization model's end objective, an early stage model may be trained based on labels indicative of the likelihood of a particular item to be in the top-K of a set of candidate items according to the target model. The early stage model training module 106 is described in greater detail herein with reference to FIG. 3.

The multi-stage model utilization module 108 can be configured to utilize a trained multi-stage recall optimization module to identify a subset of items (e.g., the top-K items) from a set of candidate items. The multi-stage model utilization module 108 can receive a set of candidate items. The set of candidate items can be provided to an early stage model. The early stage model can score and rank the set of candidate items to identify a first subset of candidate items. The first subset of candidate items can be provided to a target model. The target model can score and rank the first subset of candidate items to identify a second subset of candidate items. The second subset of candidate items may be identified as the top-K items in the set of candidate items. The multi-stage model utilization module 108 can take an appropriate action based on identification of the top-K items in the set of candidate items. For example, in the context of advertisements, the multi-stage model utilization module 108 can provide the top-K advertisements in a set of candidate advertisements for potential presentation to a user. Or in the context of content on a social networking system, the multi-stage model utilization module 108 can provide the top-K content items of a set of candidate content items for potential presentation within a user content feed. Many variations and applications are possible.

Figure 3:
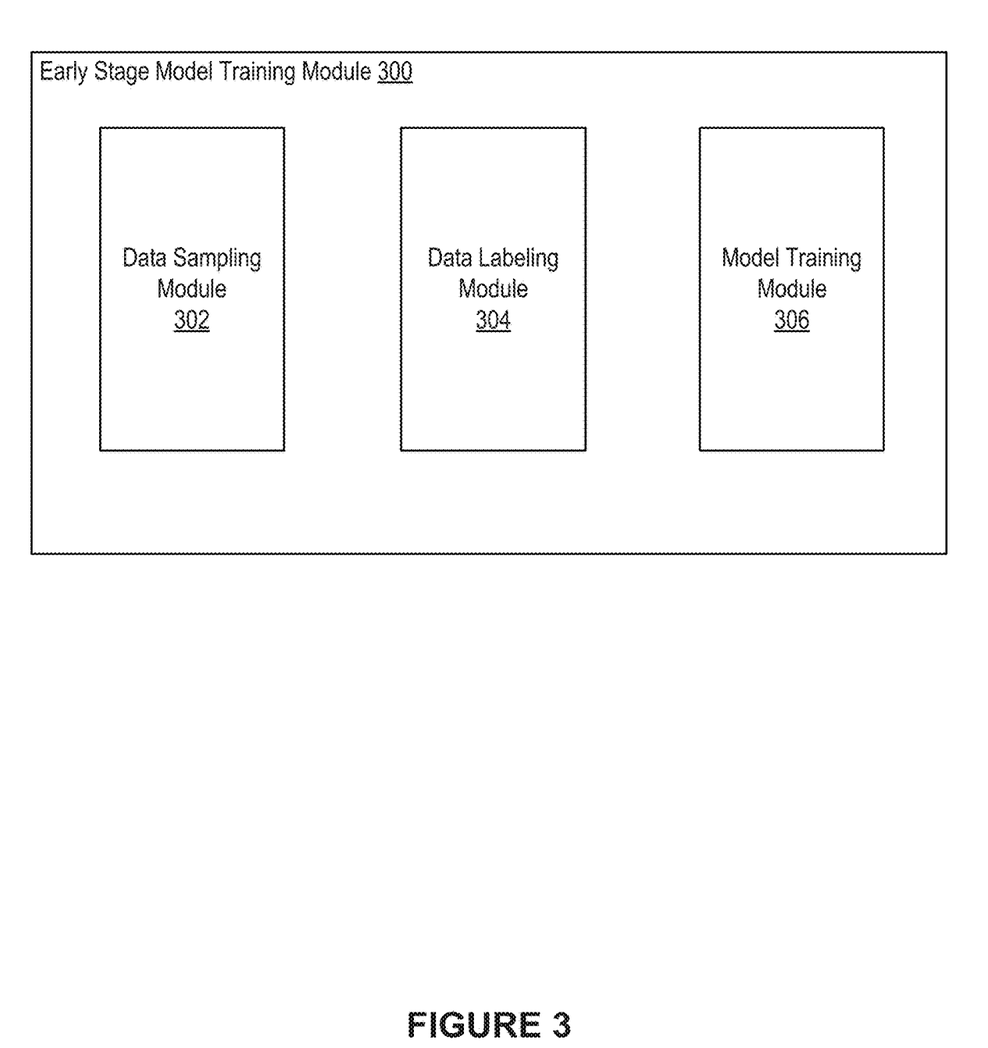
FIG. 3 illustrates an example early stage model training module, according to an embodiment of the present technology.

FIG. 3 illustrates an example early stage model training module 300, according to an embodiment of the present technology. In various embodiments, the early stage model training module 300 may be implemented as the early stage model training module 104 of FIG. 1. As shown in FIG. 3, the early stage model training module 300 can include a data sampling module 302, a data labeling module 304, and a model training module 306.

The data sampling module 302 can be configured to receive a set of training data comprising a set of candidate training items. As discussed above, the objective of an early stage model may be to determine a likelihood that a particular item of a set of items will be in the top-K of the set of items according to a target model. In a naïve approach to training an early stage model, the target model can be used to score every training item in a set of candidate training items, the top-K items in the set of candidate training items can be identified, and the set of candidate training items can be labeled using a binary label (e.g., a positive label if a training item is in the top-K, a negative label if the training item is not in the top-K). However, as also discussed above, such an approach may represent an inefficient use of computing resources. In various embodiments of the present technology, the data sampling module 302 can receive a set of candidate training items, and randomly select a subset (or random sample) of candidate training items. For example, the data sampling module 302 may select a random sample of size n from the set of candidate training items. If an associated target model is configured to select the top K items, n can be determined such that n is greater than K. As will be described below, the subset of candidate training items can be scored and labeled, while the remaining candidate training items are not.

The data labeling module 304 can be configured to receive from the data sampling module 302 the subset of candidate training items that were randomly selected from the set of candidate training items. The data labeling module 304 can determine a score for each training item of the subset of candidate training items using a target model. The subset of candidate training items can then be ranked based on the scores.

For each training item in the subset of candidate training items, the data labeling module 304 can compute a probability of the item belonging to the top-K items in the set of candidate training items if the entire set of candidate training items had been scored using the target model. In one embodiment, the probability for each training item may be determined based on a hypergeometric distribution. For example, let G(k; n, N, K) denote the cumulative distribution function of a hypergeometric distribution, which gives the probability of a random sample of size n containing at most k positively labeled samples when drawing without replacement from a population of total size N out of which K items carry positive labels. The probabilities $\theta_i$ are obtained by $\theta_i = 1 - G(i; n, N, K) + g(i; n, N, K)$, where g( ) denotes the density function of a hypergeometric distribution. In other words, because of the ordering induced by the scores for the subset of candidate training items, the probability of an item i truly belonging to the set of top-K items equals the probability of a sample of size n containing at least i items from the true set of top-K. For example, for the training item with the highest score in the subset of candidate training items, the probability of that training item being in the top-K of the overall set of candidate training items is equal to the probability of the subset of candidate training items having at least one candidate item in the true top-K of the overall set of candidate training items. Similarly, for the training item with the second highest score in the subset of candidate training items, the probability of that training item being in the top-K of the overall set of candidate training items is equal to the probability of the subset of candidate training items having at least two candidate items in the true top-K of the overall set of candidate training items. In this way, soft labels can be determined for each training item in the subset of candidate training items, wherein the soft label for a training item is indicative of the likelihood of the training item to be in the true top-K of the overall set of candidate training items. In an embodiment, the soft label values may be values between 0 and 1, and may be equal to the probability of a training item to be in the true top-K of the overall set of candidate training items.

Figure 4:
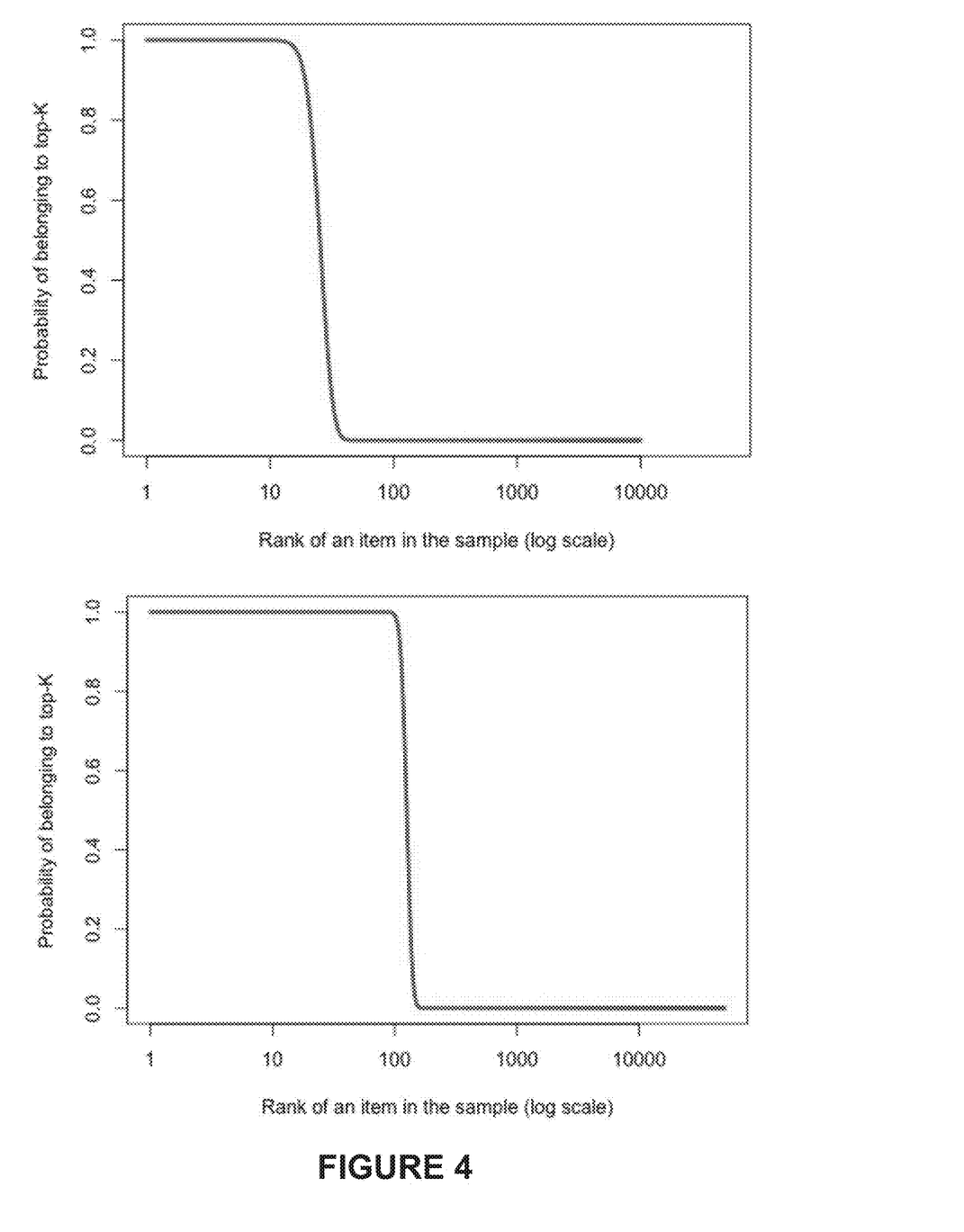
FIG. 4 illustrates example sampling data, according to an embodiment of the present technology.

FIG. 4 shows the probability θ function as a function of a training item's rank within the subset of candidate training items, assuming: (i) the input item set size N=1 million, (ii) out of which 0.25% (2,500) of items are to be considered top-K (K=2,500), and (iii) sampling rates of 1% (n=0.01N=10,000) (top) and 5% (n=0.05N, =50,000) (bottom). As can be seen in FIG. 4, even when using sampling rates as low as 1%, top ranking items in the subset of candidate training items are nearly guaranteed to belong to the true top-K set, while reducing computation cost of obtaining labeled training data by a factor of 100× compared to the brute-force approach of ranking all training items in the overall set of candidate training items. The number of high-probability top-K items in the sampled subset grows roughly linearly with sampling rate. Also note that since the ratio K/N may often be small, a random sample from the overall population may contain a large number of negatives, which are not all necessary for practical use in model training. As such, in certain embodiments, negative examples (e.g., those with θ≤0.01) can be further down-sampled, and an appropriate adjustment applied during model training by up-weighting negative examples by the reciprocal of the down-sampling rate.

Returning to FIG. 3, the model training module 306 can be configured to receive the labeled subset of candidate training items from the data labeling module 304. The model training module 306 can train the early stage model based on the labeled subset of candidate training items. Under the described data collection procedure, recall optimization boils down to learning a function p: X→[0,1] for predicting the probability of an item belonging in the top-K of a candidate set over a feature space X. Provided herein is an example loss function for training recall optimization models given labeled data $\{(\theta_i, x_i)\}_{i=1}^n$, where $\{(\theta_i)\}_{i=1}^n$ are the target probabilities that a model has to learn to predict given feature vectors $\{(x_i)\}_{i=1}^n$. Since the target quantity to be predicted is a probability distribution $q_\theta$, fully characterized by parameter θ, over a Boolean random variable, the Kullback-Leibeler (KL) divergence $D_{KL}(*\|*)$ can be used as an optimization objective:

$$\min_p E_x \left[ D_{KL}(q_\theta \| p) = -E_x[\theta \ln(p) + (1-\theta)\ln(1-p)] + C \approx \right.$$

$$\left. -\frac{1}{2} \sum_{i=1}^n [\theta_i \ln(p(x_i)) + (1-\theta_i)\ln(1-p(x_i))] + C, \right.$$

where C is independent of the function p being learned and can therefore be omitted from the optimization objective. In other words, by using KL divergence as an optimization objective, the familiar logistic loss is obtained with the only difference being that the "hard" Boolean labels have been substituted with the "soft" labels $\theta_i \in [0,1]$.

Figure 5:
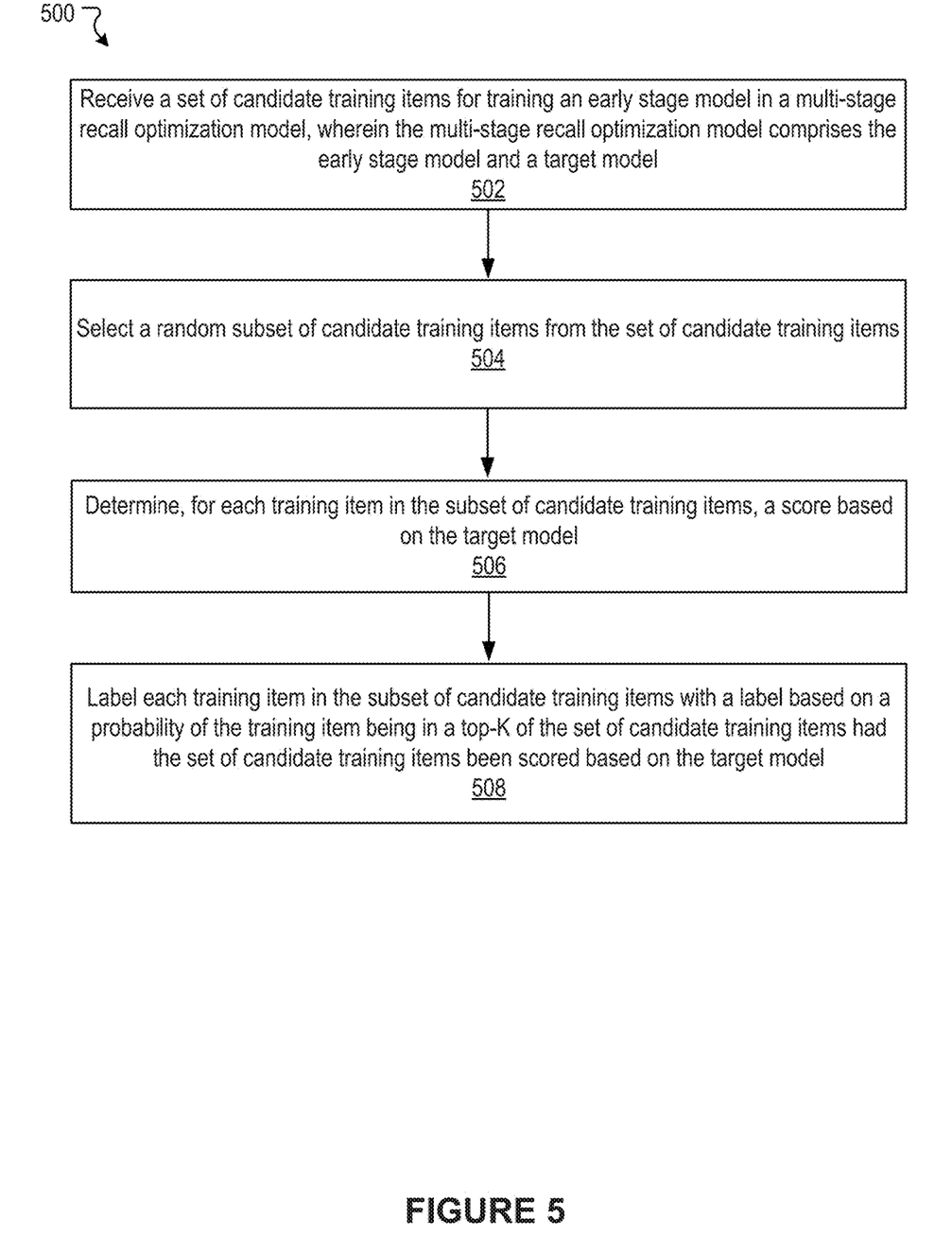
FIG. 5 illustrates an example method, according to an embodiment of the present technology.

FIG. 5 illustrates an example method 500, according to an embodiment of the present technology. It should be appreciated that there can be additional, fewer, or alternative steps performed in similar or alternative orders, or in parallel, within the scope of the various embodiments discussed herein unless otherwise stated.

At block 502, the example method 500 can receive a set of candidate training items for training an early stage model in a multi-stage recall optimization model, wherein the multi-stage recall optimization model comprises the early stage model and a target model. At block 504, the example method 500 can select a random subset of candidate training items from the set of candidate training items. At block 506, the example method 500 can determine, for each training item in the subset of candidate training items, a score based on the target model. At block 508, the example method 500 can label each training item in the subset of candidate training items with a soft label based on a probability of the training item being in a top-K of the set of candidate training items had the set of candidate training items been scored based on the target model.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
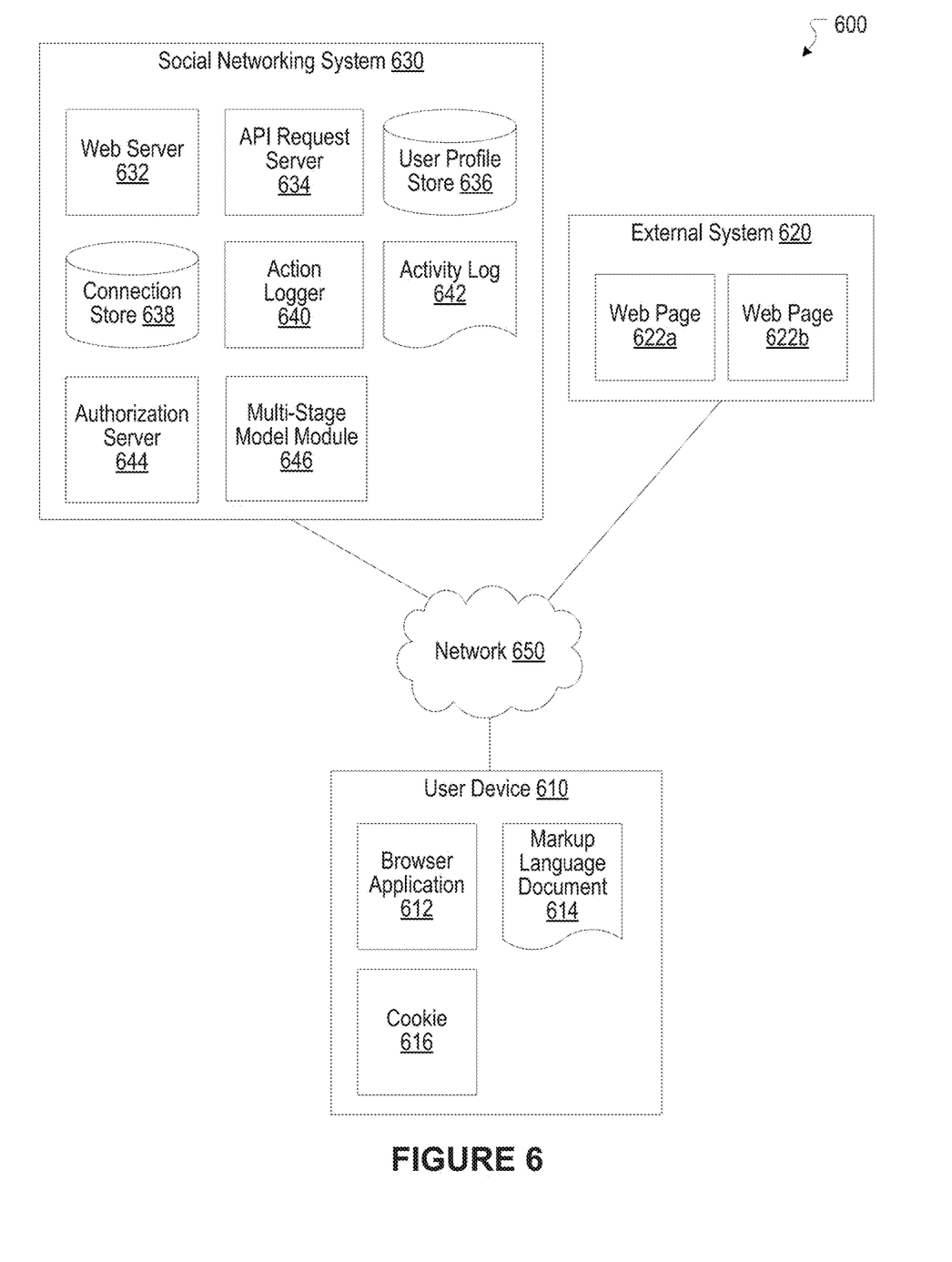
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a multi-stage model module 646. The multi-stage model module 646 can, for example, be implemented as the multi-stage model module 102, as discussed in more detail herein. As discussed previously, it should be appreciated that there can be many variations or other possibilities. For example, in some embodiments, one or more functionalities of the multi-stage model module 646 can be implemented in the user device 610. As discussed previously, it should be appreciated that there can be many variations or other possibilities.

Hardware Implementation

Figure 7:
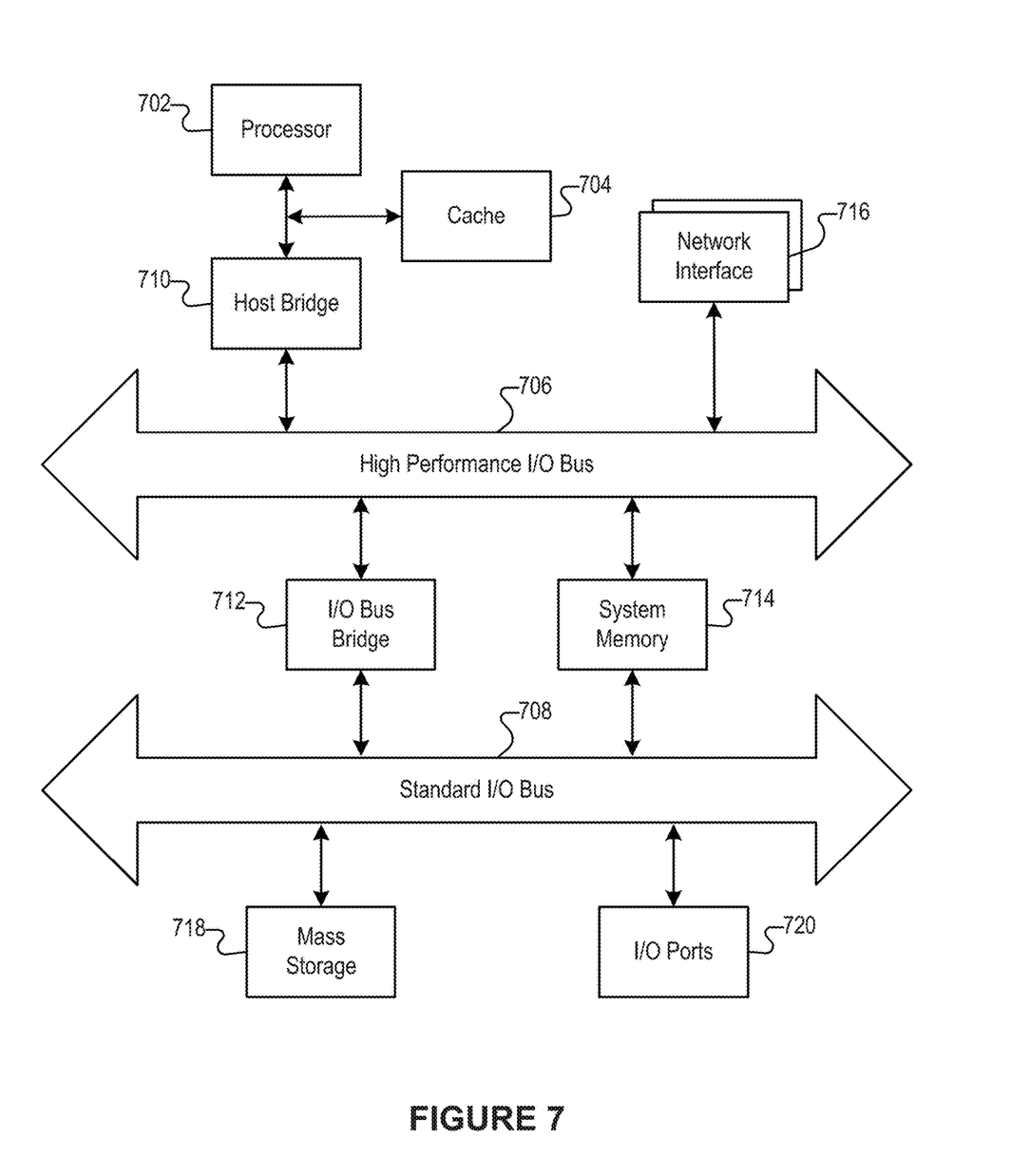
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, a set of candidate training items for training an early stage model in a multi-stage recall optimization model, wherein the multi-stage recall optimization model comprises the early stage model and a target model;
    selecting, by the computing system, a random subset of candidate training items from the set of candidate training items to train the early stage model;
    determining, by the computing system, for each training item in the subset of candidate training items, a score based on the target model; and
    labeling, by the computing system, each training item in the subset of candidate training items with a label based on a probability of the training item being in a top-K of the set of candidate training items had the set of candidate training items been scored based on the target model.

2. The computer-implemented method of claim 1, wherein the label is a non-binary label.

3. The computer-implemented method of claim 2, wherein the label is a value between 0 and 1.

4. The computer-implemented method of claim 1, wherein the probability of each training item being in the top-K of the set of candidate training items is determined based on a hypergeometric distribution.

5. The computer-implemented method of claim 4, wherein the label for a training item is equal to the probability of the training item being in the top-K of the set of candidate training items had the set of candidate training items been scored based on the target model.

6. The computer-implemented method of claim 1, further comprising training the early stage model based on the labels for the subset of candidate training items.

7. The computer-implemented method of claim 1, wherein the target model is trained based on a labeled set of training data, wherein the labeled set of training data is labeled based on user feedback information.

8. The computer-implemented method of claim 1, further comprising ranking the subset of candidate training items based on the scores.

9. The computer-implemented method of claim 1, further comprising:
    providing a set of candidate items to the multi-stage recall optimization model; and
    identifying a set of the top-K items from the set of candidate items based on the multi-stage recall optimization model.

10. The computer-implemented method of claim 9, wherein identifying the set of the top-K items from the set of candidate items based on the multi-stage recall optimization model comprises:
    identifying a first subset of the set of candidate items based on the early stage model;
    providing the first subset of the set of candidate items to the target model; and
    identifying the set of top-K items from the set of candidate items based on the target model.

11. A system comprising:
    at least one processor; and
    a memory storing instructions that, when executed by the at least one processor, cause the system to perform a method comprising:

receiving a set of candidate training items for training an early stage model in a multi-stage recall optimization model, wherein the multi-stage recall optimization model comprises the early stage model and a target model;

selecting a random subset of candidate training items from the set of candidate training items to train the early stage model;

determining, for each training item in the subset of candidate training items, a score based on the target model; and labeling each training item in the subset of candidate training items with a label based on a probability of the training item being in a top-K of the set of candidate training items had the set of candidate training items been scored based on the target model.

12. The system of claim 11, wherein the label is a non-binary label.

13. The system of claim 12, wherein the label is a value between 0 and 1.

14. The system of claim 11, wherein the probability of each training item being in the top-K of the set of candidate training items is determined based on a hypergeometric distribution.

15. The system of claim 14, wherein the label for a training item is equal to the probability of the training item being in the top-K of the set of candidate training items had the set of candidate training items been scored based on the target model.

16. A non-transitory computer-readable storage medium including instructions that, when executed by at least one processor of a computing system, cause the computing system to perform a method comprising:

receiving a set of candidate training items for training an early stage model in a multi-stage recall optimization model, wherein the multi-stage recall optimization model comprises the early stage model and a target model;

selecting a random subset of candidate training items from the set of candidate training items to train the early stage model;

determining, for each training item in the subset of candidate training items, a score based on the target model; and labeling each training item in the subset of candidate training items with a label based on a probability of the training item being in a top-K of the set of candidate training items had the set of candidate training items been scored based on the target model.

17. The non-transitory computer-readable storage medium of claim 16, wherein the label is a non-binary label.

18. The non-transitory computer-readable storage medium of claim 17, wherein the label is a value between 0 and 1.

19. The non-transitory computer-readable storage medium of claim 16, wherein the probability of each training item being in the top-K of the set of candidate training items is determined based on a hypergeometric distribution.

20. The non-transitory computer-readable storage medium of claim 19, wherein the label for a training item is equal to the probability of the training item being in the top-K of the set of candidate training items had the set of candidate training items been scored based on the target model.

* * * * *